(12) United States Patent
Levy et al.

(10) Patent No.: US 8,254,716 B2
(45) Date of Patent: Aug. 28, 2012

(54) METHOD FOR ADAPTIVE IMAGE ENHANCEMENT

(75) Inventors: Avi Levy, Tivon (IL); Ziv Aviv, Bat Hefer (IL)

(73) Assignee: Intel Corporation, Santa Clara, CA (US)

( * ) Notice: Subject to any disclaimer, the term of this patent is extended or adjusted under 35 U.S.C. 154(b) by 1293 days.

(21) Appl. No.: 11/954,860

(22) Filed: Dec. 12, 2007

(65) Prior Publication Data

US 2009/0154828 A1 Jun. 18, 2009

(51) Int. Cl.
*G06K 9/40* (2006.01)
*G06K 15/00* (2006.01)
(52) U.S. Cl. .......... 382/261; 358/2.1; 358/3.27
(58) Field of Classification Search .......... 382/261; 358/2.1, 3.27
See application file for complete search history.

(56) References Cited

U.S. PATENT DOCUMENTS

| | | | | |
|---|---|---|---|---|
| 5,710,840 A * | 1/1998 | Hideshima et al. | ........... | 382/266 |
| 5,982,441 A * | 11/1999 | Hurd et al. | ........... | 348/417.1 |
| 6,137,899 A * | 10/2000 | Lee et al. | ........... | 382/133 |
| 6,195,467 B1 * | 2/2001 | Asimopoulos et al. | ........... | 382/261 |
| 7,082,211 B2 * | 7/2006 | Simon et al. | ........... | 382/118 |
| 7,724,936 B2 * | 5/2010 | Oosawa | ........... | 382/132 |
| 7,756,355 B2 * | 7/2010 | Kryda et al. | ........... | 382/275 |
| 2001/0048757 A1 * | 12/2001 | Oosawa | ........... | 382/130 |
| 2004/0080790 A1 * | 4/2004 | Abe | ........... | 358/3.13 |
| 2008/0181455 A1 * | 7/2008 | Greig | ........... | 382/103 |
| 2009/0103797 A1 * | 4/2009 | Hong et al. | ........... | 382/132 |

* cited by examiner

*Primary Examiner* — Jason M Repko
*Assistant Examiner* — Patrick Edwards
(74) *Attorney, Agent, or Firm* — Carrie A. Boone, P.C.

(57) ABSTRACT

A filtering system and method are disclosed, to perform simultaneous, de-noising, and details enhancement tasks of a video image. The efficient filtering system includes multiple filters, which operate on a portion of the video image that has been partitioned into multiple rings. Using the filtering system, complex mathematical operations are avoided.

6 Claims, 8 Drawing Sheets

METHOD FOR ADAPTIVE IMAGE ENHANCEMENT

TECHNICAL FIELD

This application relates to image processing and, more particularly, to efficient image filtering operations.

BACKGROUND

Image and video enhancement processes usually contain two conflicting tasks—noise reduction and details enhancement. The noise reduction task involves attenuating high frequency components, while the details enhancement task is performed by increasing high and mid frequency elements of an image. Hence, some linear approaches for reconstructing images or video sequences that have been affected by blurring and by additive noise have very poor performance. The more sophisticated adaptive approaches are effective but are more computationally demanding and are difficult to implement in real time.

Thus, there is a continuing need for a method for image and video enhancement that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an efficient filtering system and method are disclosed, for performing simultaneous, de-noising, and details enhancement tasks of a video image. The efficient filtering system includes multiple filters, which operate on a portion of the video image that has been partitioned into multiple rings. Using the efficient filtering system, complex mathematical operations are avoided.

Figure 1:
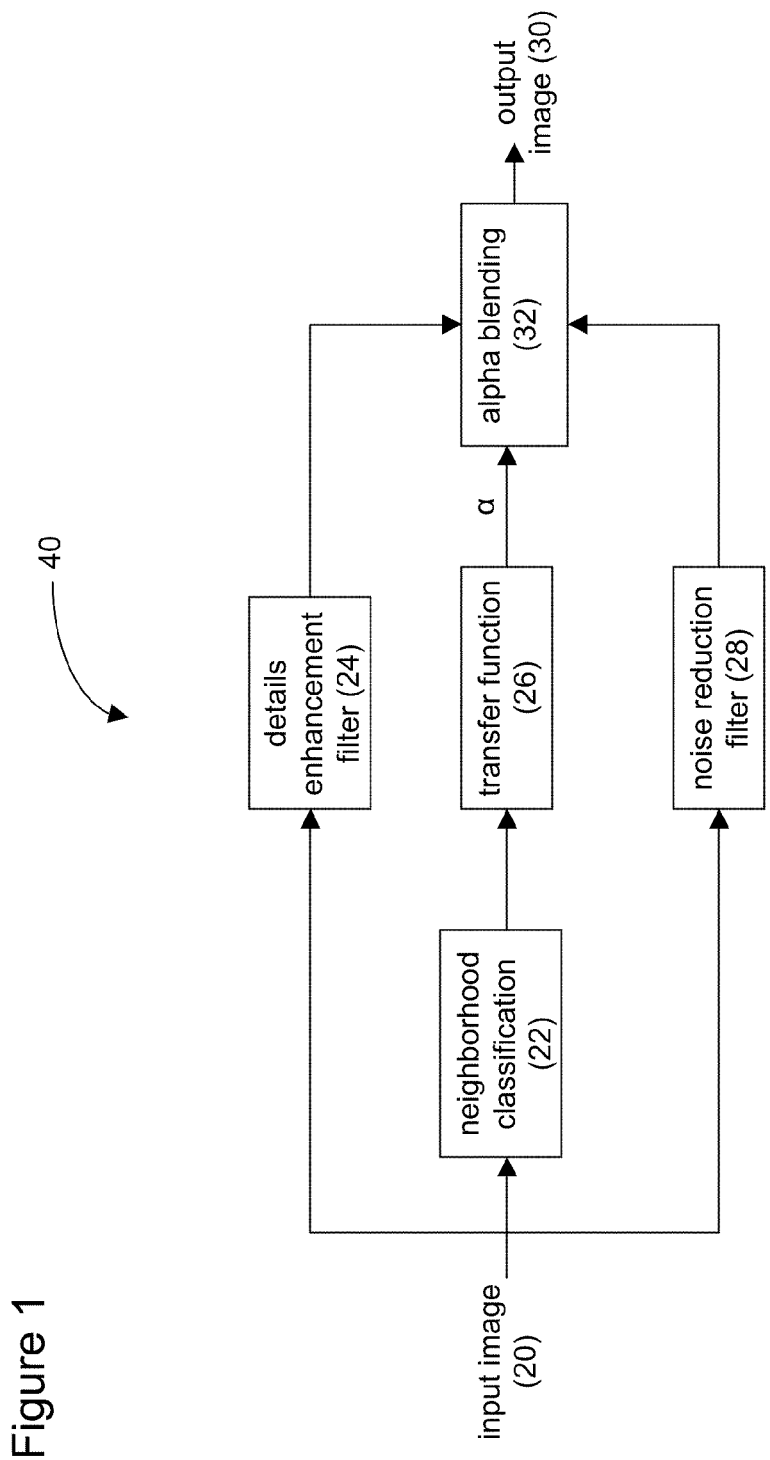
FIG. 1 is a block diagram of an adaptive filtering scheme, according to some embodiments.

FIG. 1 is a block diagram of an adaptive filtering scheme 40, according to some embodiments. The adaptive filtering scheme 40 includes a neighborhood classification module 22, a details enhancement filter 24, a transfer function module 26, a noise reduction filter 28, and an alpha blending module 32. These components perform operations on an input image 20 to produce an output image 30.

The neighborhood classification module 22 generates a continuous measure of the pixel neighborhood of the input image 20, including data that are visually significant (visual significant measure). The neighborhood classification module 22 measure has low values for flat areas and high values for neighborhoods with significant details (e.g., edge or texture). The noise reduction filter 28 may be a linear smoothing (averaging) filter. The details enhancement filter 24 may be a linear sharpening (un-sharp mask) filter.

The transfer function module 26 receives the visual significant measure from the neighborhood classification module 22. Based on this measure, the transfer function produces a normalized factor (between 0 and 1), denoted α, according to which the output of the two filters 24 and 28 are blended by the alpha blending module 32. For low visual significant measure values, the contribution of the noise reduction filter (module 28) get higher weight, while for high visual significant measure values, the contribution of the details enhancement filter (module 24) get higher weight.

The effectiveness of the adaptive filtering scheme 40 takes into consideration that the human visual system is sensitive to noise in flat image regions and is less sensitive to noise in regions with high variability.

Figure 2:
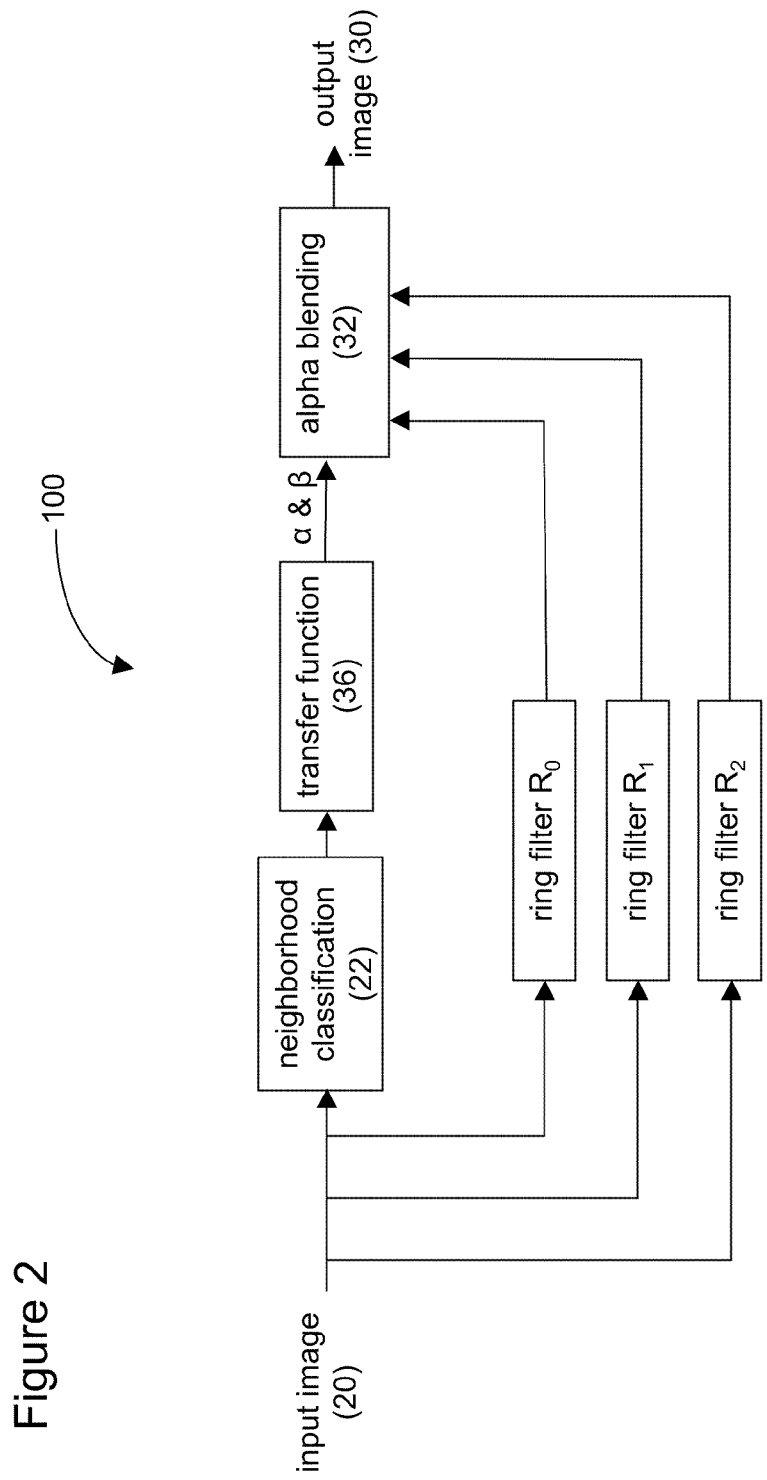
FIG. 2 is a block diagram of an efficient filtering system, according to some embodiments.

An implementation of the general adaptive filter scheme 40 (FIG. 1) may be relatively expensive, due to computing the two filtering operations for each pixel. FIG. 2 is a block diagram of an efficient filtering scheme 100, according to some embodiments. The efficient filtering system 100 involves significantly less computational effort than the filtering scheme 40.

The efficient filtering system 100 makes use of the radial symmetry of smoothing and sharpening filters. As with the adaptive filtering scheme 40, the efficient filtering system 100 includes the neighborhood classification module 22, a transfer function module 36, and the alpha blending module 32. Instead of the details enhancement filter 24 and noise reduction filter 28, however, the efficient filtering system 100 employs three ring filters, a ring filter $RF_0$, a ring filter $RF_1$ and a ring filter $RF_2$. The ring filters may be standard linear filters that each has as input a ring-shaped neighborhood. The efficient filtering system 100 may be generalized to n rings, where n is an integer.

The neighboring classification module 22 and the transfer function module 26 may be standard image processing modules that analyze the current pixel ($P_{0,0}$) neighborhood and set the values of the parameters, α and β. The neighborhood classification module 22 traditionally uses such features as local variability, responses of horizontal and vertical Sobel operators, and so on. The transfer function module 26 produces the blending coefficients, α and β, in the desired range and in such a way that small change in the neighborhood features does not cause a significant change in the blending coefficient values. This continuity may prevent temporal artifacts that may otherwise be caused by strong detail enhancement operation.

The efficient filtering system 100 is demonstrated on a 5×5 filtering environment, although the principles illustrated herein can be applied to other environments. The 5×5 filter computation may be partitioned into three simple "ring" filter computations, with the results blended in an adaptive way.

The ring filters blending, using only two multiplications, may produce results comparable to the results achieved by the highly complex general scheme (the adaptive filter 40 of FIG. 1).

Figure 3:
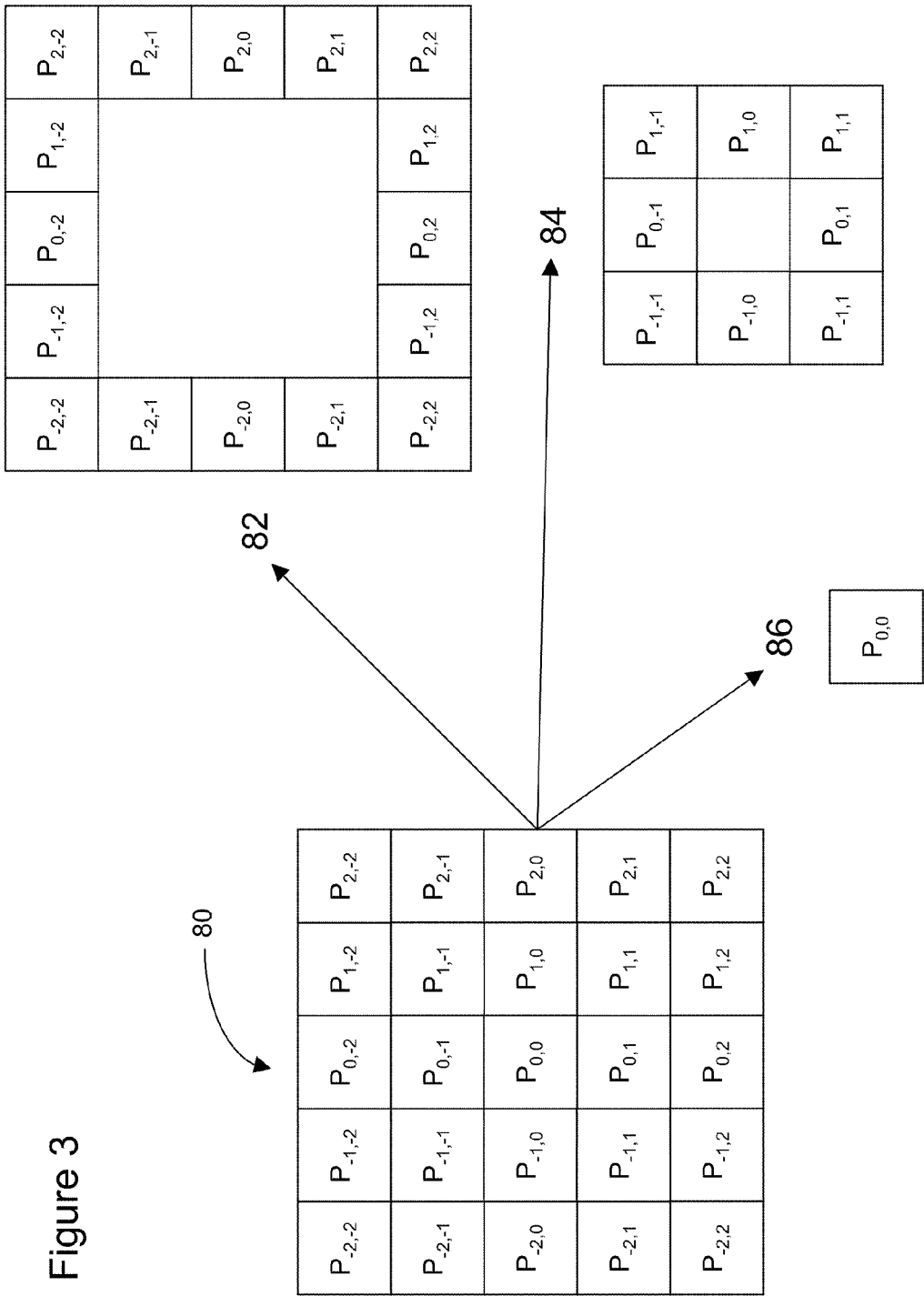
FIG. 3 is a block diagram illustrating the partitioning of a 5×5 environment using three ring environments, according to some embodiments.

FIG. 3 illustrates how a 5×5 filtering environment may be split into three environments suitable for filtering by the efficient filtering system 100, according to some embodiments. A 5×5 arrangement of pixels 80 is depicted, with each pixel being uniquely denoted according to its row and column location as $P_{row,column}$, where $-2 \leq row \leq 2$ and $-2 \leq column \leq 2$.

The 5×5 arrangement 80 may be divided into three "ring" arrangements, with the "outside" of the arrangement 80 forming a first ring 82, the center minus the middle pixel, $P_{0,0}$, forming a second ring 84, and the middle pixel, $P_{0,0}$, forming the third ring 86. The ring 82 may be processed by the ring filter $R_2$, the second ring 84 may be processed by the ring filter $R_1$, and the third ring 86 may be processed by the ring filter $R_0$, of the efficient filtering system 100.

Denoting the pixel indexes in the 5×5 neighborhood by $$\{P_{i,j}\}_{\substack{i=-2,2 \\ j=-2,2}}$$

and the corresponding filter coefficients by $$\{F_{i,j}\}_{\substack{i=-2,2 \\ j=-2,2}},$$

the output of the three ring filters may be written as:

$$PR_0 = P_{0,0},\ PR_1 = \sum_{i,j \in R_1} F_{i,j}(P_{i,j} - P_{0,0}),$$

$$PR_2 = \sum_{i,j \in R_2} F_{i,j}(P_{i,j} - P_{0,0}).$$

The adaptive filter output is now given by:

$$P_{out} = PR_0 + \alpha PR_1 + \beta PR_2,$$

where $\alpha$ and $\beta$ are coefficients provided by the transfer function module 26. Since the two outer ring filters are computed on pixel differences, $P_{i,j} - P_{0,0}$, it is verified that this adaptive filter is always normalized, i.e. the sum of its coefficients is equal to 1. Hence, filter coefficient normalization (which is expensive computationally) is avoided. By using the ring filters, $R_0$, $R_1$, and $R_2$, the adaptive filtering may be performed with a computational complexity that is equivalent to computing one linear filter only.

The above case may be though of as an n-ring implementation, where n=2. Generalized to n rings for integer n, the adaptive filter output may be given by:

$$P_{out} = PR_0 + \alpha_1 PR_1 + \alpha_2 PR_2 + \ldots + \alpha_n PR_n,$$

where $\alpha_1, \alpha_2, \ldots, \alpha_n$ are coefficients provided by the transfer function module 26. For the case where n=2, the coefficient, $\alpha_1 = \alpha$, and $\alpha_2 = \beta$.

Figure 4:
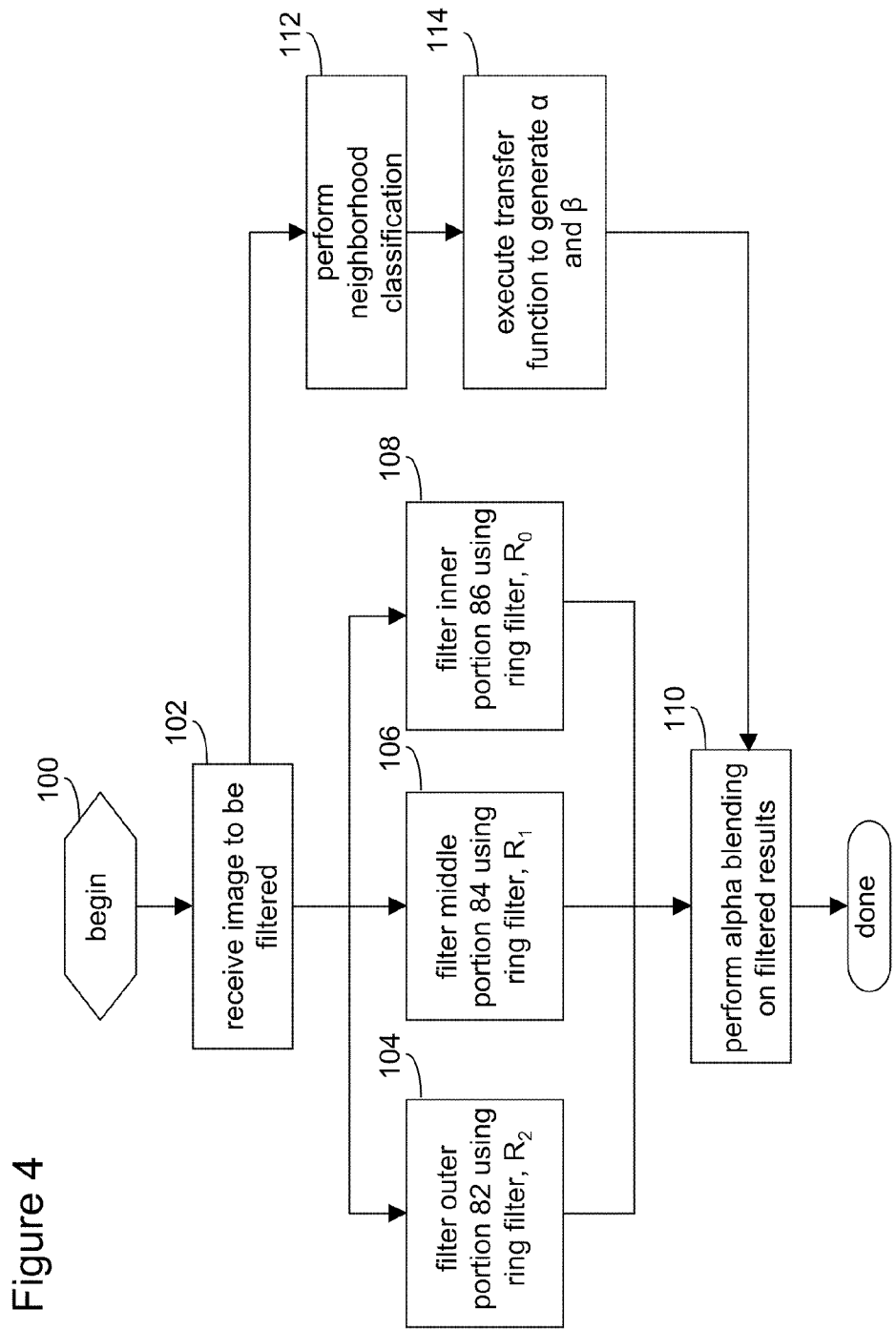
FIG. 4 is a flow diagram illustrating operations performed by the efficient filtering system of FIG. 2, according to some embodiments.

FIG. 4 is a flow diagram of operations performed by the efficient filtering system 100, according to some embodiments. The filter 100 receives an image 20 to be filtered (block 102). For each pixel in the input image, a symmetric neighborhood of 5×5 pixels is being processed by the three ring filters, $R_0$, $R_1$, and $R_2$.

The next operations 104, 106, and 108 are performed simultaneously, in some embodiments. The three ring portions 82, 84, and 86, may each be filtered using the respective ring filters, $R_0$, $R_1$, and $R_2$ (FIG. 2). The outer portion may be filtered using the $R_2$ ring filter (block 104). The middle portion may be filtered using the $R_1$ ring filter (block 106). The inner portion may be filtered using the $R_0$ ring filter (block 108).

While the ring filters, $R_0$, $R_1$, and $R_2$ are filtering their respective portions of the pixel neighborhood, the filtering system 100 may also be performing neighborhood classification (block 112). Here, the pixel neighborhood is analyzed. Then, the transfer function 36 is executed, which generates the coefficients, $\alpha$ and $\beta$ (block 114). Following the filtering operations, the results may be alpha blended using the alpha blending module 32 (block 110).

In some embodiments, the computational efficiency of the efficient filtering system 100 may further be improved by using constant (and very simple) coefficients for the ring filters, $R_0$, $R_1$, and $R_2$. In this way, the ring filter computations may be performed with no multiplications and the adaptive filter may be computed with two multiplications ($\alpha*PR_1$ and $\beta*PR_2$) only.

Figure 5:
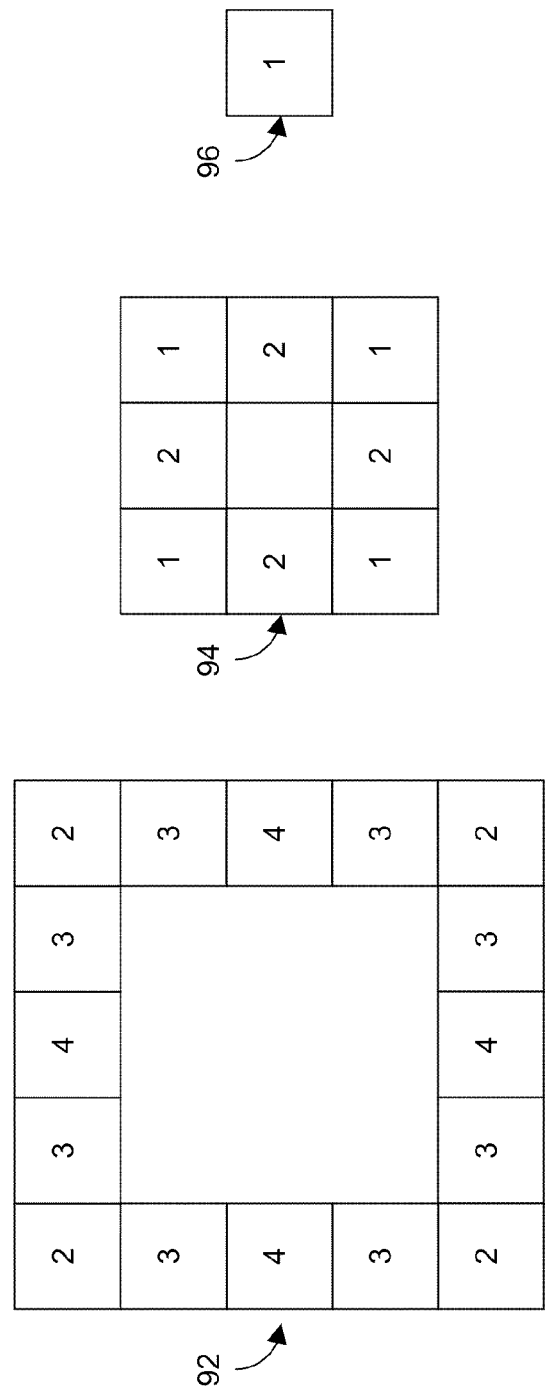
FIG. 5 is a block diagram of ring filters with simple (integer) coefficients, according to some embodiments.

Despite its efficiency, the ring filter-based adaptive filter 100 can perform an entire range of image processing operations usually achieved by more complex adaptive filters, in some embodiments. This is done by carefully selecting the coefficients, $\alpha$ and $\beta$. Table 1 demonstrates performing the three basic image processing operations by using the ring filter coefficients 92, 94, and 96 in FIG. 5, according to some embodiments. Table 1 provides data for high-frequency enhancement, mid-frequency enhancement, and high-frequency attenuation, including values for coefficients, $\alpha$ and $\beta$.

Figure 6:
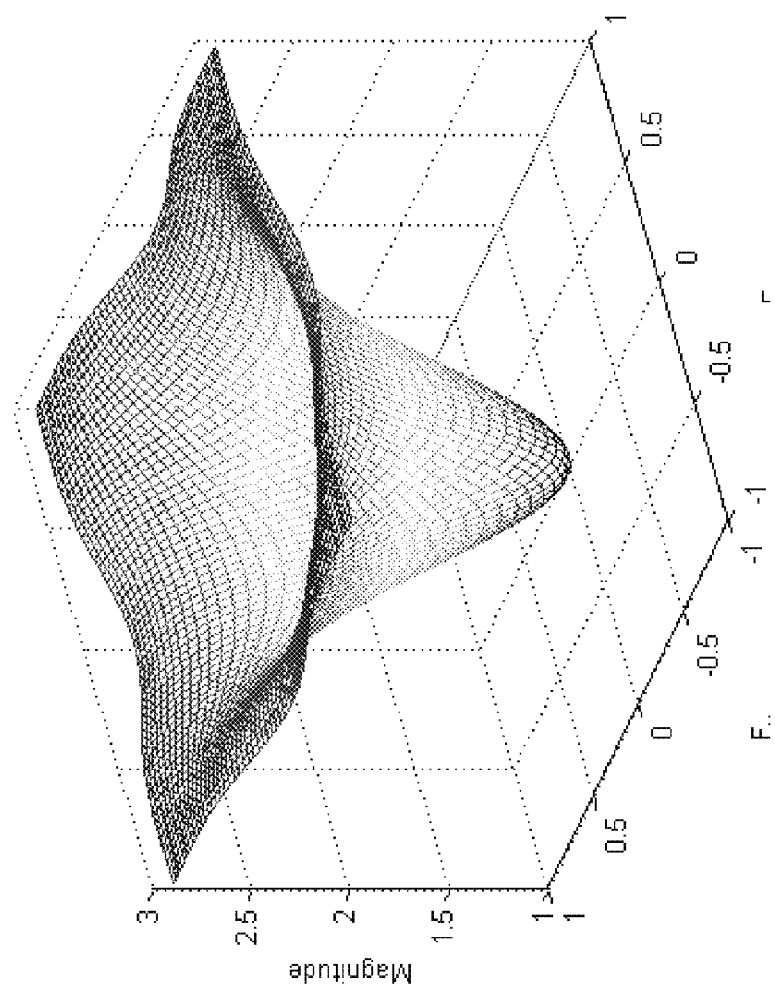
FIG. 6 is a diagram of the filter frequency response for a high-frequency enhancement of the efficient filtering system of FIG. 2, according to some embodiments.
Figure 7:
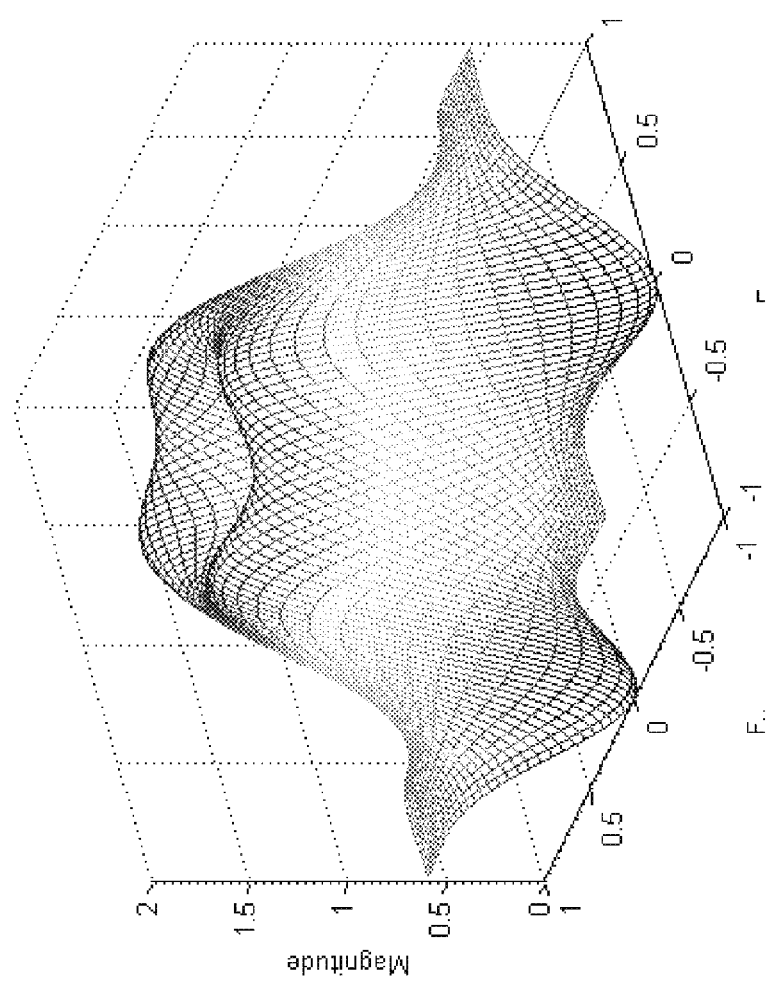
FIG. 7 is a diagram of the filter frequency response for a mid-frequency enhancement of the efficient filtering system of FIG. 2, according to some embodiments.
Figure 8:
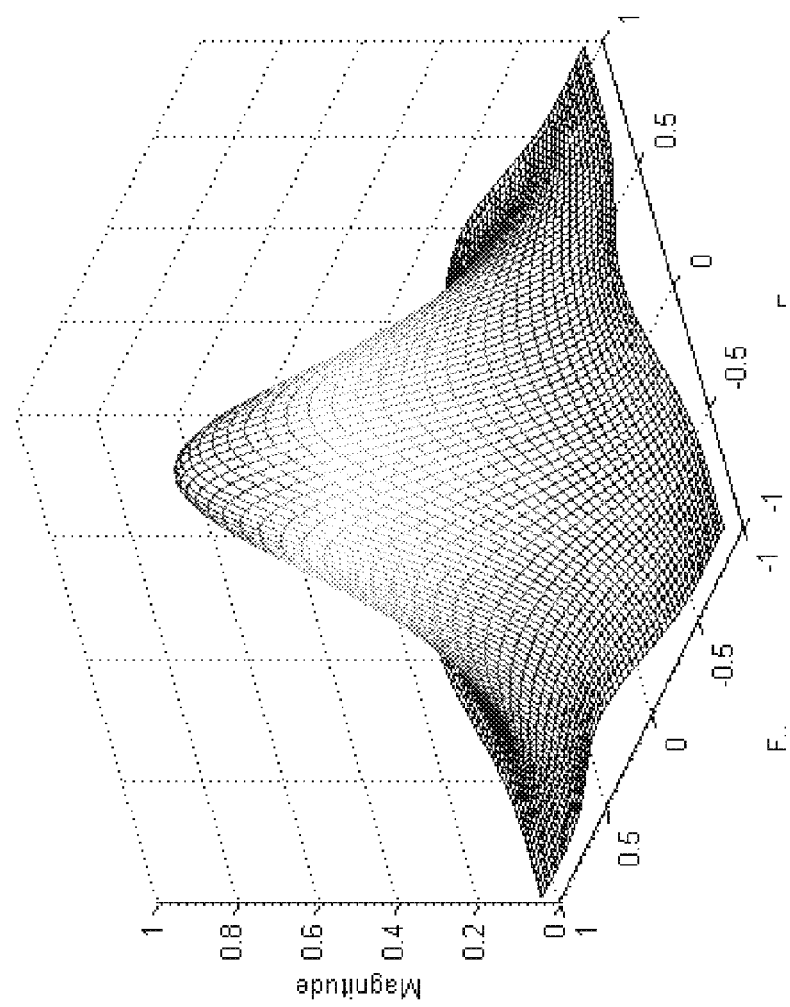
FIG. 8 is a diagram of the filter frequency response for a high-frequency attenuation of the efficient filtering system of FIG. 2, according to some embodiments.

FIGS. 6, 7, and 8 illustrate the filter frequency responses for the high-frequency enhancement, mid-frequency enhancement, and high-frequency attenuation examples, respectively, of Table 1.

TABLE 1 image processing operations based on adaptive ring filters.

| filter type | filter frequency response |
|---|---|
| high-frequency enhancement (emphasizes details) $\alpha = -\dfrac{1}{10}$ $\beta = -\dfrac{1}{160}$ | see FIG. 6 |
| mid-frequency enhancement (emphasizes major details and reduces noise) $\alpha = \dfrac{1}{10}$ $\beta = -\dfrac{1}{40}$ | see FIG. 7 |
| high-frequency attenuation (noise reduction) $\alpha = \dfrac{1}{20}$ $\beta = \dfrac{1}{320}$ | see FIG. 8 |

The efficient filtering system 100 may be implemented using hardware, software, or a combination of software and hardware. In some embodiments, the efficient filtering system 100 allows implementing the advance image processing feature, adaptive filtering, using only a fraction of the resources required for this feature in a standard implementation. Hence, reduced gate count or processing time, or both, may be realized using the efficient filtering system 100.

The efficient filtering system 100 is a novel approach for implementing adaptive filtering not found in prior art implementations. Adaptive filtering is a common practice in image processing. However, adaptive filtering is complex and requires a lot of system resources. Hence, adaptive filtering is prohibitive in certain platforms. With the efficient filtering system 100, high quality adaptive filtering may be performed with very low resource consumption. The efficient filtering system 100 also allows a very simple control over the functionality of the adaptive filter, since only two parameters ($\alpha$ and $\beta$) are involved in the filter design. This is another advantage over other implementations that require the tuning of many coefficients and parameters.

While the application has been described with respect to a limited number of embodiments, those skilled in the art will appreciate numerous modifications and variations therefrom. It is intended that the appended claims cover all such modifications and variations as fall within the true spirit and scope of the invention.

The invention claimed is:

1. A filtering system, comprising:
   a classification module, to receive an input image and, for each pixel in the input image, analyze a current pixel neighborhood of the pixel and generate a measurement that is representative of a visual characteristic of the current pixel neighborhood;
   n ring filters for integer n, each ring filter to operate on a different ring-shaped neighborhood of the current pixel neighborhood, the n ring filters comprising:
      a first ring filter to operate on a first ring-shaped neighborhood comprising the pixel, the first ring filter to generate a first output, $PR_0$;
      a second ring filter to operate on a second ring-shaped neighborhood comprising pixels surrounding the first ring-shaped neighborhood, the second ring filter to generate a second output, $PR_1$; and
      a third ring filter to operate on a third ring-shaped neighborhood comprising pixels surrounding the second ring-shaped neighborhood, the third ring filter to generate a third output, $PR_2$;
   a transfer function to receive the measurement from the classification module, the transfer function to generate n−1 blending coefficients; and
   an alpha blending module to modify the pixel of the input image based on the n−1 blending coefficients received from the transfer function and the outputs from the n ring filters.

2. The filtering system of claim 1, wherein the alpha blending module generates the following value:

$$P_{out} = PR_0 + \alpha_1 PR_1 + \alpha_2 PR_2 + \ldots + \alpha_n PR_n,$$

wherein $\alpha_1, \alpha_2 \ldots \alpha_n$ are the blending coefficients and $P_{out}$ is used to modify the pixel of the input image as part of an output image.

3. The filtering system of claim 1, wherein the operations performed by the first, second, and third ring filters comprise linear filtering operations.

4. The filtering system of claim 1, wherein the current pixel neighborhood is a symmetric neighborhood in which an equal number of pixels is located to the left of the pixel, to the right of the pixel, above the pixel, and below the pixel.

5. The filtering system of claim 4, wherein the pixel neighborhood is a 5×5 pixel neighborhood defined by $$\{P_{i,j}\}_{\substack{i=-2,2 \\ j=-2,2}}$$

for integers i and j.

6. A method for performing efficient filtering of an image, the method comprising:
   for each pixel in the image, defining a 5×5 pixel neighborhood surrounding a pixel, the 5×5 neighborhood being defined by $$\{P_{i,j}\}_{\substack{i=-2,2 \\ j=-2,2}}$$

for integers i and j;
   performing a linear filtering operation on an inner portion of the 5×5 pixel neighborhood using a first ring filter, $R_0$, resulting in a first output, wherein the inner portion comprises a single pixel in the center of the 5×5 pixel neighborhood;
   performing a second linear filtering operation on a middle portion of the 5×5 pixel neighborhood using a second ring filter, $R_1$, resulting in a second output, wherein the middle portion comprises eight pixels surrounding the inner portion; and
   performing a third linear filtering operation on an outer portion of the 5×5 pixel neighborhood using a third ring filter, $R_2$, resulting in a third output, wherein the outer portion comprises sixteen pixels surrounding the middle portion;
   performing neighborhood classification of the 5×5 pixel neighborhood to generate a measurement that is representative of a visual characteristic of the 5×5 pixel neighborhood;
   executing a transfer function based on the measurement, the transfer function to generate two coefficients; and
   alpha-blending the first output, the second output, and the third output with the two coefficients, then adding the blended outputs together, to update the pixel;
wherein the pixel is part of an output image.

* * * * *